Patented June 20, 1950

2,511,913

UNITED STATES PATENT OFFICE 2,511,913

COMPOSITIONS OF RESINOUS EPOXIDES AND AROMATIC AMINE ALDEHYDE CONDENSATES

Sylvan Owen Greenlee, Racine, Wis., assignor to Devoe & Raynolds Company, Inc., Louisville, Ky., a corporation of New York No Drawing. Application September 4, 1946, Serial No. 694,823

14 Claims. (Cl. 260—45)

This invention relates to new products and compositions resulting from the reaction of condensates of aldehydes and aromatic amines with polyepoxides or complex epoxides in regulated proportions to give valuable compositions which are useful in the manufacture of varnishes, molding compositions, adhesives, films, molded articles, etc.

The invention includes initial reaction mixtures or compositions containing the polyepoxides or complex epoxides with the aromatic amine-aldehyde condensates, as well as intermediate and final reaction products or compositions, methods for their production, and articles and products made therefrom.

The invention includes as primary and important embodiments thereof reaction mixtures and reaction products of the polyepoxides and of the complex epoxides with the condensates of aromatic amines and aldehydes.

According to the present invention condensates of aromatic amines and aldehydes, in the form of initial or intermediate reaction or condensation products, are admixed with polyepoxides or with complex epoxides, or are reacted with such epoxides to form new compositions suitable for reaction or further reaction to form new complex reaction products.

One of the objects of the invention is the production of initial reaction mixtures or compositions containing condensates of aromatic amines and aldehydes with complex epoxides in proportions suitable for reaction to form resins, films, molding compositions, etc.

Another object of the invention is the production of intermediate reaction products of such aromatic amine-aldehyde condensates and polyepoxides or complex epoxides, such reaction products being capable of further reaction to form insoluble infusible products. Another object of the invention is the preparation of higher molecular weight and more complex compositions from such intermediate reaction products.

Another object of the invention is the production of films, articles, molded products and other final reaction products from such condensates and polyepoxides or from such condensates and complex epoxides.

Other objects of the invention will appear from the following more detailed description.

The condensates of aromatic amines and aldehydes, which are used for reacting with the polyepoxides or with the complex epoxides according to the present invention, are initial or intermediate reaction or condensation products formed by the reaction of aromatic amines such as aniline with aldehydes such as formaldehyde. It is known that various aromatic amines will condense with aldehydes to form aldehyde-amine condensates or resins. Thus, it is known that aniline, for example, will react with formaldehyde to form resinous condensation products and that other aromatic amines and other aldehydes will also react to form condensates or resins. The condensates of aromatic amines and aldehydes, which are used with polyepoxides or complex epoxides in making the new compositions of the present invention, are in general partial and intermediate reaction or condensation products; are particularly soluble condensation products which are soluble in the same solvents as the polyepoxides or complex epoxides; or are fusible condensation products which can be melted and blended with the polyepoxides or complex epoxides.

The polyepoxides used for reaction with the condensates of aromatic amines and aldehydes contain two or more epoxide groups. The polyepoxides are of a complex character such as those that result from the reaction of two or more mols of a diepoxide with one mol of a dihydric phenol, or the reaction of three or more mols of a diepoxide with one mol of a trihydric phenol, etc. The polyepoxide compounds used may have varying structures and may be of complex structure, so long as they do not contain groups which interfere with the desired reaction of the polyepoxide and the aldehyde aromatic amine condensate.

The complex epoxides used in making the new compositions are produced by the reaction of polyhydric phenols with polyfunctional halohydrins and alkali, or with polyepoxides, to form complex reaction products containing terminal epoxide groups. The production of such complex epoxides is described in my companion applications, Serial Nos. 617,176, filed September 18, 1945, 621,856, filed October 11, 1945, and 626,449, filed November 2, 1945.

In my companion application, Serial No. 626,449 filed November 2, 1945, I have described new polyepoxy products and compositions obtained by the direct addition of polyhydric phenols and polyepoxides, with the proportion of polyepoxides reacting with the polyhydric phenols in excess of the equivalent amount so that the resulting reaction products will contain terminal epoxy groups. Such polyepoxy reaction products are advantageously used for reaction with the amine-aldehyde condensates to give the new compositions and products of the present invention.

In my companion application, Serial No. 653,156, I have described complex epoxide-containing compositions obtained by the reaction of phenolaldehyde condensates with polyepoxides to give compositions which contain unreacted epoxide groups. Such epoxide compositions are also advantageously used for reaction with the aldehyde amine condensates to give the new compositions and products of the present invention.

In my companion application, Serial No. 617,176, filed September 18, 1945, I have described complex polymeric reaction products of polyhydric phenols with polyfunctional halohydrins such as epichlorohydrin and glycerol dichlorohydrin, with the difunctional chlorohydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin, to give complex polymeric products containing terminal epoxy groups and terminal hydroxyl groups and with the epoxy groups, in general, considerably in excess of the terminal primary hydroxyl groups. Such complex polymeric epoxy-hydroxy products and compositions are advantageously used for reaction with the amine-aldehyde condensates to give the new compositions and products of the present invention.

In my companion application, Serial No. 621,856, filed October 11, 1945, I have described the epoxy-hydroxy compositions resulting from the reaction of a polyhydric phenol with a polyfunctional halohydrin, such as epichlorohydrin, in approximate proportions of 2 mols of epichlorohydrin to 1 mol of dihydric phenol to give resinous products containing both terminal epoxy and hydroxy groups, with the proportion of terminal epoxy groups considerably in excess of the terminal hydroxy groups. Such epoxy-hydroxy compositions are also advantageously used for reaction with the aldehyde-amine condensates to give the new compositions and products of the present invention.

Complex epoxide-containing compositions can also be produced by the reaction of complex polyhydric phenols with polyfunctional halohydrines such as epichlorohydrin and glycerol dichlorohydrin, with the difunctional chlorohydrin used in proportions in excess of that equivalent to the polyhydric phenol; the polyhydric phenol being a complex polyhydric phenol derived from the reaction of a simple polyhydric phenol such as resorcinol, hydroquinone, and bisphenol (p,p'-dihydroxy-diphenyl dimethyl methane) with polyhalides which contribute no hydroxyl groups to the resulting composition, using the polyhydric phenol in proportions in excess of that equivalent to react with all of the halogen groups present in the polyhalide. Such complex epoxy-hydroxy products and compositions are also advantageously used for reaction with the aldehyde-amine condensates to form the new compositions and products of the present invention.

The complex epoxides used with the aldehyde-aromatic amine condensates or resins are resinous epoxides containing epoxide and hydroxyl groups as their functional groups and are free from other functional groups such as basic and acid groups.

The aldehyde-aromatic amine condensates or resins used for compounding and reacting with the polyepoxides and complex epoxides may be at different stages of conversion or condensation when used for compounding with the polyepoxides or complex epoxides, and compositions of somewhat different character can be obtained with products of different stages of conversion. Thus in some cases it is desirable to have a composition which is completely soluble in a common solvent or mixture or solvents and, in that case, it is advantageous to use an aldehyde-amine condensate which is soluble in solvents in which the polyepoxide or complex epoxide is also soluble. By using the aldehyde-amine condensate and epoxide in a common solvent, solutions can be prepared and applied, and the solvent subsequently evaporated before the main reaction between the epoxide and the condensate takes place. Compositions can thus be made which are solutions of the condensate and epoxide and which can be used to impregnate porous materials, etc. and the reactants subsequently caused to react after removal of the solvent and heating to a high temperature.

For other purposes it is desirable to use a powdered solid resin with a liquid reactant and, in such cases, the aldehyde-amine condensate may be a finely divided solid material and the polyepoxide or complex epoxide used in a liquid form. For other applications very viscous compositions are desired and, in this case, one or more ingredients of the reaction mixture, or the reaction mixture itself, can be polymerized or reacted so as to obtain the desired viscosity.

In making the new compositions the aldehyde-amine condensate and the epoxide are compounded in reacting proportions, either without or with the addition of a catalyst, and the reaction will, in general, be carried out with the application of heat.

The reactions which take place between the aldehyde-amine condensate and the polyepoxide or complex epoxide appear to be complex in nature. While I do not desire to limit myself by any theoretical explanation of the exact nature or mechanism of the reaction, it seems probable that the reaction is in part one between an epoxide group of the polyepoxide or of the complex epoxide, and active hydrogen atoms directly attached to oxygen or to nitrogen in the aldehyde-amine condensate. Since it is known that the aldehyde-amine condensates convert upon the application of heat under proper conditions to infusible products, it seems likely that the final conversion of the compositions containing such condensates and also containing the polyepoxides or complex epoxides include a number of reactions, among them the normal condensation reactions of the aldehyde-amine condensate and the reaction of epoxide groups of the epoxides by direct addition to hydroxyl groups or to amine groups of the condensates; while reaction may also take place between epoxide groups with hydroxyl groups present in the epoxides or liberated in the course of the reaction of epoxide groups with hydroxyl groups; and direct polymerization may take place of the epoxides with themselves. Whatever the theoretical explanation may be of the complex reactions which take place when the epoxides are compounded with the aldehyde-amine condensates and caused to react therewith, valuable reaction products can be produced as a result of such reactions.

It may be that various reactions take place simultaneously or successively in the process of reaction between the epoxides and the aldehyde-amine condensates to form the intermediate and final reaction products. It may be also that certain reactions take place at a more rapid rate than others at different stages of the reaction.

Just as different aldehyde-amine condensates may be more or less reactive with the epoxides, so the different epoxides may vary in their activity with the aldehyde-amine condensates.

The reactivity of the different complex epoxides with the aldehyde-amine condensates is somewhat dependent upon the type or structure and equivalent weight of the complex epoxides. The equivalent weight as used in referring to the complex epoxides means the weight which is equivalent to one epoxide group, or the weight which is capable of entering into reaction by direct addition with one hydroxyl group or one amine group. The method used for determining the epoxide content or equivalent weight of the composition per epoxide group was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Usually the complex epoxides of low equivalent weight to epoxide groups are more highly reactive with the aldehyde condensates than complex epoxides of higher equivalent weight to epoxide groups. In general, the complex epoxides advantageously contain more than one epoxide group per molecule and may advantageously contain an average of around one and one-half or two epoxide groups per molecule. The complex epoxides are in general resinous in character. They may in some cases be liquid products, but for many practical purposes the resinous polyepoxides are solid at ordinary temperatures. The complex epoxy resins are soluble, unless too highly polymerized, in solvents such as acetone, methyl ethyl ketone, diacetone alcohol, cyclohexanone, etc.; and some of the complex epoxides of low melting point and low degree of polymerization are soluble in toluene.

Catalysts which have been found particularly advantageous for bringing about the reaction of the epoxides with the aldehyde-amine condensates are alkaline catalysts, such as aliphatic amines, sodium and potassium hydroxide and alkali phenoxides. Certain of the Friedel-Crafts type catalysts are also catalytic for these reactions. Of such catalysts boron trifluoride has been found to be extremely active in promoting such reactions and in fact too active in a number of cases to be used as such. However, if a latent type catalyst which on the application of heat liberates boron trifluoride is used, the reaction may be controlled such that it gives a smooth conversion. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decompose at higher temperatures to give boron trifluoride, which catalyzes the polymerization or reaction through epoxide groups.

The final conversion of the composition made with the aldehyde-amine condensates and with the polyepoxides or complex epoxides, may be carried out with or without the use of solvents and with or without the use of plasticizers, depending on the final results desired.

In protective coating applications it is usually desirable to apply a product which is essentially a solid dissolved in a solvent, in which case it undergoes a preliminary dry by mere solvent evaporation, and the dry film may then be converted to an infusible, insoluble product on further heat treatment; and the compositions of the present invention are well adapted for this purpose.

On the other hand, when the compositions of the present invention are used to make molded objects, it is usually desirable to use a composition which contains no solvent, and in some cases a composition which may be used in a dry powdered form.

In still other applications, it is desirable to have a composition, containing no solvent, which is sufficiently liquid at a relatively low temperature to be used directly in the impregnation of wood and certain fabric materials.

The present invention provides a wide range of reaction compositions and products including initial mixtures of the aldehyde-amine condensates with the polyepoxides or complex epoxides, as well as partial or intermediate reaction products of such initial mixtures, and compositions containing such intermediate reaction products as well as final reaction products and compositions.

Another modified form of the invention includes the use with the aldehyde-amine condensates, in place of the complex epoxides previously formed, of mixtures of the ingredients or reactants which go to make up the complex epoxides. Thus mixtures of simple polyepoxides and polyhydric phenols on the application of heat give complex epoxides as described in my prior application Serial No. 626,449. The conditions required for the reaction of complex epoxides with the aldehyde-amine condensates are much the same as those required for the reaction of the simple polyepoxides with polyhydric phenols, and it is therefore possible to carry out all of these reactions as a part of the same process, although it is probable that other reactions may also take place such as those between the simple polyepoxide and the aldehyde condensate, as well as between the simple polyepoxides and polyhydric phenols to form complex reaction products.

Thus initial mixtures and compositions can be made containing a simple polyepoxide such as diepoxybutane or diglycide ether together with a polyhydric phenol such as bisphenol, etc. and the aldehyde-amine condensates such as an aniline-formaldehyde condensate. Such a mixture in proper proportions forms a valuable initial composition which can be used in liquid form or in solution, and with subsequent heating, either without or with the addition of a catalyst, to bring about the reaction and to form intermediate reaction products of a resinous character or to form final reaction products. Such initial compositions containing simple polyepoxides, polyhydric phenols and aldehyde-amine condensates can be used in much the same manner as initial compositions of complex epoxides and aldehyde-amine condensates. In general when simple polyepoxides are used with polyhydric phenols and aldehyde-amine condensates, a somewhat higher proportion of the polyepoxide is advantageously used than in making the complex epoxide separately by reacting the simple polyepoxides with polyhydric phenols.

Other modifying agents and compounding agents or reactants may also be used in making the new compositions. Thus, other resins such as alkyd resins or phenol-aldehyde resins can be admixed with the aldehyde-amine condensates or resins and with the polyepoxides or complex epoxides, and reaction brought about by heating the mixture to form valuable compositions of a modified character.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin-bonded grinding wheels, it is desirable to introduce abrasive materials and other fillers into the compositions in which the resinous composition acts as a bonding material for the fillers and abrasives when the compositions are subjected to final hardening.

The invention will be further illustrated by the following specific examples but it will be understood that the invention is not limited thereto. In the examples the parts are by weight.

The examples relating to the new compositions are Examples X to XIII and XV.

Examples I to IV and XIV illustrate the production of the condensates of aldehydes and aromatic amines. Examples V to VII illustrate the production of the complex epoxides. Example VIII illustrates the production of a special polyepoxide. And Example IX illustrates a liquid resin prepared from a polyepoxide and a polyhydric phenol.

*Example I.*—A fusible aniline-aldehyde condensate was prepared by dissolving 100 parts (1 mol) of aniline in 500 parts of 95% alcohol and refluxing with 90 parts of 37% formaldehyde (1.2 mol) in the presence of .04 part of formic acid for 2 hours. The addition of 250 parts of water then helped to coagulate the resin which was isolated and which was thereafter dried by heating.

*Example II.*—A thermoplastic aniline-phenol aldehyde was prepared by refluxing 100 parts (1 mol) of aniline and 25 parts (.27 mol) of phenol with 90 parts (1.2 mol) of 37% formaldehyde. The resin was steam distilled to remove volatile products. The excess water was removed and the resin dried by heating.

*Example III.*—A non-heat converting aniline-aldehyde condensate was prepared by dissolving 100 parts (1 mol) of aniline in 500 parts of alcohol and refluxing with 96 parts (1 mol) of furfural in the presence of 0.7% concentrated hydrochloric acid. The resin precipitated and became stiff after refluxing for 15 minutes; and heating was discontinued and the resin air dried.

*Example IV.*—A soluble alpha-naphthyl amine-aldehyde condensate was prepared by refluxing 143 parts of alpha-naphthyl amine (1 mol) in 250 parts of ethyl alcohol with 93 parts (1.24 mol) of 37% formalin and .04 part of formic acid. The product changed from an oil to a light taffy which hardened to form a granular solid. The solid product was separated and dried.

*Example V.*—A complex epoxide was prepared by heating 3 mols of bisphenol with 3.88 mols of epichlorohydrin in the presence of 4.85 moles of sodium hydroxide giving a product which melted at 100° C. and had an epoxide equivalent of 800.

*Example VI.*—A complex epoxide was prepared by heating 100 parts of the product of Example V with 5.3 parts of bisphenol taking one hour to go from 150° C. to 200° C. and holding at 200° C. for one and one-half hours. This product melted at 130° C. and contained an epoxide equivalent of 1300.

*Example VII.*—A complex epoxide was prepared from 8 mols of resorcinol and 9 mols of epichlorohydrin with 9.5 mols of sodium hydroxide and having a melting point of 87° C. and an equivalent weight to epoxide of 1780.

*Example VIII.*—A liquid epoxide was prepared from 1 mol of glycerin and 3 mols of epichlorohydrin by the following procedure:

In a reaction vessel provided with a mechanical stirrer and external cooling means was placed 276 parts of glycerol and 828 parts of epichlorohydrin, and to this reaction mixture was added one part of 45% boron trifluoride ether solution diluted with 9 parts of ether. The reaction mixture was agitated continuously, the temperature rose to 50° C. over a period of 1 hour and 44 minutes, at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation, the reaction mixture was gradually heated to 93° C. over a period of 1 hour and 51 minutes, and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

*Example IX.*—A liquid resin was prepared by dissolving 224 parts of bisphenol in 476 parts of the liquid epoxide of Example VIII at 100° C. When cold, this resin had a viscosity of $Z_1$ at 20° C.

*Example X.*—20 parts of the aniline-formaldehyde product of Example I and 80 parts of the epoxide resin of Example IX containing 6% sodium phenoxide catalyst were baked in a mold 1 hour at 150° C. The converted material was rubber-like at 150° C. but quite tough and flexible when cold. This mixture converts at the same baking schedule to give tough flexible films.

*Example XI.*—25 parts of the alpha-naphthyl amine-formaldehyde resin described in Example IV was mixed with 75 parts of the complex epoxide of Example VI and dissolved in methyl ethyl ketone. A film of this composition without any catalyst converted in one-half hour at 200° C. showing great hardness and excellent flexibility. Addition of 5% diethylene-triamine-boron fluoride complex gave a molding composition that converted at 150° C. in one-half hour after the solvent was expelled.

*Example XII.*—Equal parts of the aniline-phenol-formaldehyde resin of Example II and the complex epoxide of Example V were fused together, mixed well and baked at 150° C. for one-half hour without a catalyst. The resulting product was a very hard product.

Addition of 5% sodium phenoxide (based on epoxide) before molding resulted in a product of greater flexibility and toughness.

*Example XIII.*—A molded object was obtained by mixing 6% sodium phenoxide with 8 parts of the epoxide described in Example V, adding 2 parts of the resin obtained in Example I and fusing the mixture by baking one hour at 150° C. The product was infusible.

*Example XIV.*—A heat converting amine resin was made by dissolving 108 parts (1 mol) of m-phenylene diamine in 2000 parts of butanol and adding with stirring 128 parts (1½ mol) of a 37% solution of formaldehyde in butanol. The resin which precipitated was soluble in acetonyl acetone but became infusible on heating.

*Example XV.*—To a solution of 45 parts of the resin of Example XIV in acetonyl acetone was added 55 parts of the resin from Example VII. The solution so formed was spread as a film which hardened at 100° C. in one-half hour, to give a hard, brittle film.

In a similar manner other compositions and reaction mixtures and products can be produced from other condensates of aldehydes and aromatic amines with other polyepoxides or with complex epoxides or mixtures thereof.

It will thus be seen that the present invention provides improved resinous, plastic compositions and products in which condensates of aromatic amines and aldehydes are admixed with polyepoxides or complex epoxides, or both, or with simple polyepoxides and polyhydric phenols, to form initial compositions capable of conversion into intermediate or into final reaction or polymerization products.

It will also be seen that the initial compositions may be used directly in making liquid coating compositions or in making molded articles, etc. with subsequent conversion by heating into the final reaction product.

It will further be seen that intermediate reaction products can be produced which are soluble and fusible, and which are capable of further reaction to form final infusible products.

The new compositions are capable of admixture with various other resins in forming the final molding mixtures, and can also be used for compounding the fillers in making molded articles or for impregnating paper, fabric, wood, etc., and in making impregnated or coated or laminated articles.

Products and compositions of varying properties can be produced by using varying proportions of the aldehyde-amine condensate and of the polyepoxide or complex epoxide, or both, as well as by using resins of somewhat different properties. With high melting aldehyde-amine condensates or high melting complex polyepoxide resins, a limited amount of reaction may be sufficient to convert the mixed product into a final infusible product. With aldehyde-amine condensates or complex epoxide resins of an intermediate stage of condensation, the reaction can be carried out in stages to form intermediate plastic compositions which can be subsequently converted into the final products.

The final infusible reaction and polymerization products made from the new compositions have a remarkable combination of desirable properties.

I claim:

1. The method of producing new resin compositions which comprises adding substantial amounts of aldehyde-aromatic amine resins containing active hydrogen to complex epoxide resins containing an average of more than one epoxide group per molecule, which epoxide resins are polymeric products containing alternating aromatic nuclei and aliphatic groups united through ether oxygen and containing epoxide and hydroxyl groups as their functional groups and being free from other functional groups, and heating said admixed resins to form resinous reaction products.

2. The method according to claim 1 in which the resins are heated in the presence of a catalyst selected from the group which consists of aliphatic amines, alkali metal hydroxides, alkali phenoxides, and boron trifluoride catalysts.

3. The process according to claim 1 in which the heating is stopped at an intermediate stage at which the reaction product is fusible to produce an intermediate composition capable of further reaction to form a final reaction product.

4. A new resinous composition containing in admixture substantial proportions of an aldehyde-aromatic amine resin containing active hydrogen and of a complex epoxide resin containing an average of more than one epoxide group per molecule, which epoxide resin is a polymeric product containing alternating aromatic nuclei and aliphatic groups united through ether oxygen and containing epoxide and hydroxyl groups and being free from other functional groups.

5. A resin composition as defined in claim 4, said composition being in the form of a homogeneous liquid.

6. A resinous composition as defined in claim 4, said composition being in the form of a solution of said resins in a common organic solvent.

7. Intermediate reaction products resulting from the heating of the resins defined in claim 4 and the discontinuing of the heating while the product is still soluble, said intermediate reaction products being capable of further reaction to form insoluble products.

8. Infusible and insoluble resinous products resulting from the reaction of the resin composition of claim 4.

9. A new resin composition containing in admixture substantial proportions of an aldehyde-aromatic amine resin containing active hydrogen and of a complex epoxide resin containing an average of more than one epoxide group per molecule resulting from the reaction of bisphenol with epichlorhydrin in the presence of caustic alkali, and which complex epoxide resin is a polymeric product containing alternating aromatic and aliphatic nuclei united through ether oxygen and containing epoxide and hydroxyl groups and being free from other functional groups.

10. A resinous composition as defined in claim 9 in which the aldehyde-aromatic amine resin is a formaldehyde-alpha naphthylamine resin.

11. A resinous composition such as defined in claim 9, in which the aldehyde-aromatic amine resin is a formaldehyde-aniline resin.

12. Intermediate reaction products resulting from the partial and limited reaction of the resin composition of claim 9 by heating to form soluble reaction products, which intermediate reaction products are capable of further reaction to form an infusible product.

13. Infusible resinous products resulting from the reaction of the resin composition of claim 9.

14. A molding composition made of the composition of claim 9 together with a catalyst selected from the group which consists of aliphatic amines, alkali metal hydroxides, alkali phenoxides, and boron trifluoride catalysts and capable of forming on hardening an infusible molded product.

SYLVAN OWEN GREENLEE.

REFERENCES CITED

The following references are of record in the file of this patent:

UNITED STATES PATENTS

| Number | Name | Date |
|---|---|---|
| 1,969,744 | Gams et al. | Aug. 14, 1934 |
| 2,060,715 | Arvin | Nov. 10, 1936 |
| 2,136,928 | Schlack | Nov. 15, 1938 |

FOREIGN PATENTS

| Number | Country | Date |
|---|---|---|
| 495,402 | Great Britain | Nov. 14, 1938 |